United States Patent [19]
Busboom et al.

[11] Patent Number: 4,878,681
[45] Date of Patent: Nov. 7, 1989

[54] STEERING SULKY FOR TOWING VEHICLES

[75] Inventors: Garry W. Busboom; Gary L. Rogge, both of Beatrice, Nebr.

[73] Assignee: Exmark Manufacturing Company, Incorporated, Beatrice, Nebr.

[21] Appl. No.: 172,491

[22] Filed: Mar. 24, 1988

[51] Int. Cl.$^4$ .................. B62D 63/00; B62D 13/04
[52] U.S. Cl. .................... 280/32.7; 280/444; 280/493
[58] Field of Search ............ 280/32.7, 460 R, 492, 280/493, 100, 98, 99, 81 B, 95, 656, 443, 444, 442

[56] References Cited

U.S. PATENT DOCUMENTS

| | | | |
|---|---|---|---|
| 826,867 | 7/1906 | Nevens | 280/32.7 |
| 2,100,447 | 11/1937 | Mahaffey | 280/443 |
| 2,533,553 | 12/1950 | Burns | 280/443 |
| 2,539,972 | 1/1951 | Purdy | 280/443 |
| 2,795,435 | 6/1957 | Ortiz et al. | 280/493 |
| 2,890,065 | 6/1959 | Shaffer | 280/492 |
| 3,312,480 | 4/1967 | Greenstreet | 280/443 |
| 3,366,398 | 1/1968 | Mulholland | 280/444 |
| 3,876,240 | 4/1975 | Watson | 280/443 |
| 4,720,119 | 1/1988 | Ritter | 280/443 |

FOREIGN PATENT DOCUMENTS

| | | | |
|---|---|---|---|
| 883709 | 7/1953 | Fed. Rep. of Germany | 280/443 |
| 1036656 | 8/1958 | Fed. Rep. of Germany | 280/444 |

*Primary Examiner*—Charles A. Marmor
*Assistant Examiner*—Karin Tyson
*Attorney, Agent, or Firm*—George R. Nimmer

[57] ABSTRACT

Steering sulkies of the present invention are based upon the "crank/steering-rod" mechanical principle but provide profound refinements thereover. Cranking is provided at first and at second stations. At the first cranking station, preferably overlapping left-link and right-link effect simultaneous rotation of the two sulky wheels about their transversely separated vertical axes in response to towing vehicle steering; such first crank is contingently abuttable against blocking stops to prevent sulky jackknifing. The second crank, which is co-rotatable with the first crank, is connected to the rearward end of elongate steering-rod that herein intersects the frame longitudinal-axis before being terminally connected to a frontal hitch. A preferred hitch provides a convenient, reliable, and multi-directional flexural connection between a lawn-mower or other towing vehicle and the trailing self-steering sulky.

12 Claims, 3 Drawing Sheets

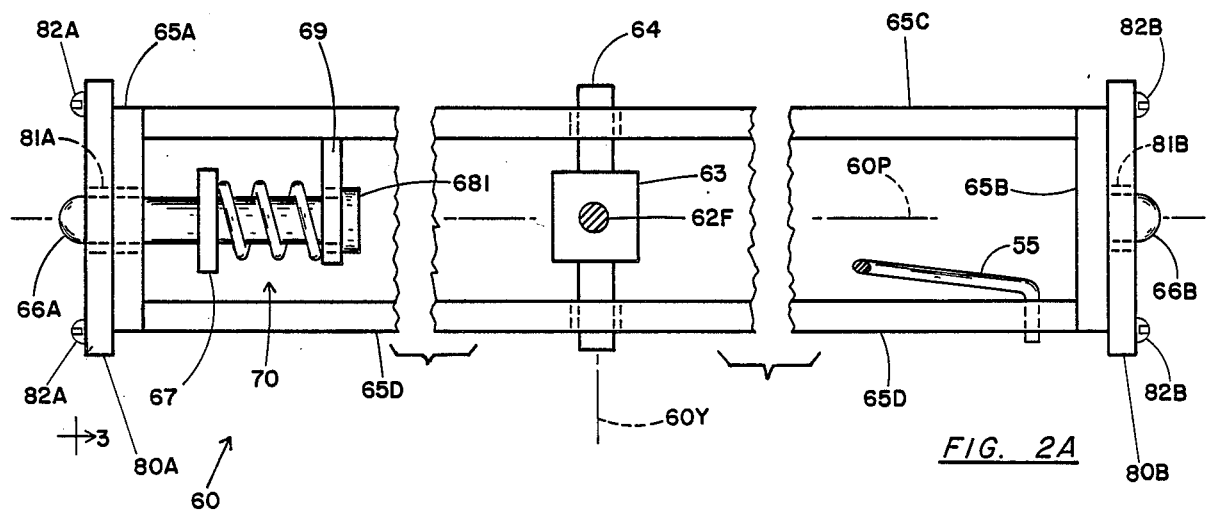
FIG. 2
FIG. 2A
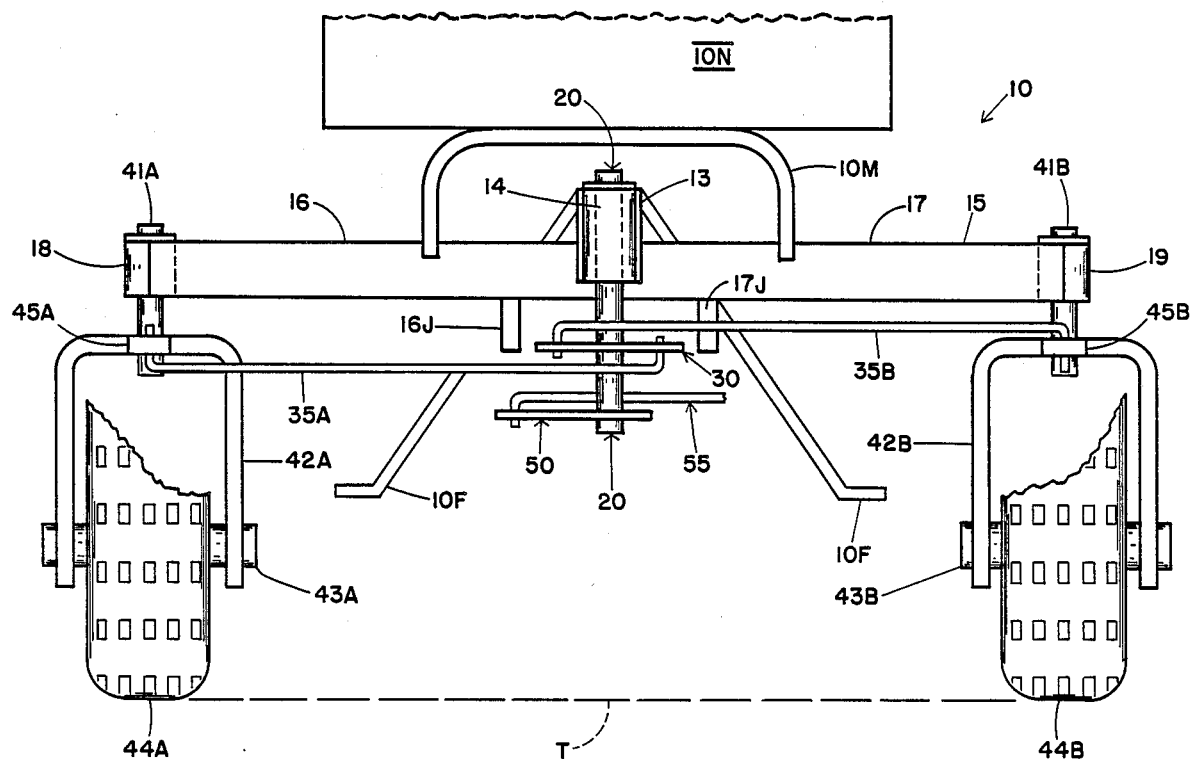

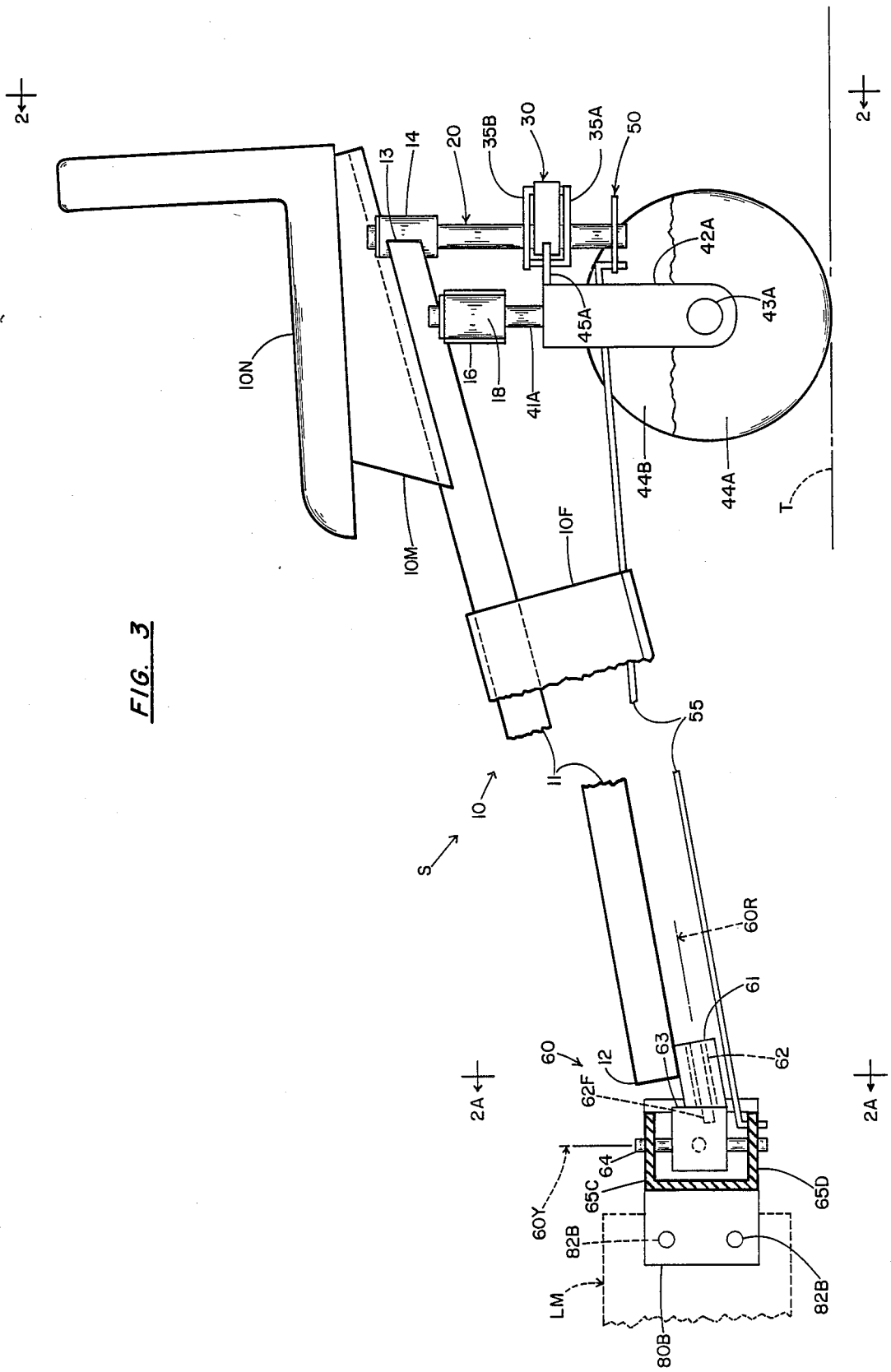

STEERING SULKY FOR TOWING VEHICLES

BACKGROUND OF THE INVENTION

Self-steering sulky type trailers for hitching to lawnmowers or other self-propelled towing vehicles might be of the "crank/steering-rod" type as described in U.S. Pat. 2,100,447 (Mahaffey - 11/30/1937). In such "crank/steering-rod" self-steering sulkies, the two sulky wheels are rotatable about their transversely separated vertical axles (and which vertical axles are located above the wheels' horizontal axes), and there is an elongate steering-rod terminally connected:

(a) at its rearward end, connected to crank means for simultaneously turning both sulky wheels about their vertical axles in response to towing vehicle turning, and (b) at its forward end, connected to the hitching means at a location transversely offset from the towing vehicle longitudinalaxis.

Although the "crank/steering-rod" general principal is basicly sound and is to be retained herein, prior art workers have been vexed with several problems in their efforts to utilize the "crank/steering-rod" principle for sophisticated applications. One problem is that the sulky trailing pathway tends to deviate substantially from that of the towing vehicle. In this regard, for example, if the towing vehicle is a lawnmower, there is the danger that the riding operator may lose his manual reach and can no longer manipulate the lawnmower steering controls. Another problem is that the sulky is without jackknife prevention means. For example, for lawnmower tows attempting to circumnavigate trees or cemetary memorials, jackknifing of the sulky might cause injury to the sulky rider's torso or limbs. Another problem is that the hitch between the towing vehicle and the sulky lacks the capability for multi-directional flexure whereby inimical forces are subjected between the steered towing vehicle and the trailing sulky.

OBJECTIVES OF THE INVENTION

It is accordingly the general objective of the present invention to provide steering sulkies that are based upon the "crank/steering-rod" basic principle but that avoids the disadvantages and deficiencies heretofore associated with the utilization of this otherwise meritorious mechanical principle. Ancillary general objectives include the provision of a non-centripital self-steering trailing relationship by the sulky, prevention of sulky jackknifing and/or turf damage ancillary to sharply turned steering by the towing vehicle, and prevention of imimical forces exerted between the towing vehicle and the steering sulky during sharp turns and/or over rough terrain.

GENERAL STATEMENT OF THE INVENTION

With the aforementioned general objectives in view, and together with other specific and related objectives which will become more apparent as this description proceeds, the self steering sulky concept of the present invention retains the "crank/steering-rod" basic principle of the prior art but provides profound refinements thereover, which might be generally summarized as follows: the crank is divided into two stations including a first crank station equipped with overlapping left-link and right-link which (ancillary to towing vehicle steering) cause the sulky wheels to simultaneously rotate about their transversely separated vertical axes, and also including a second crank station that is co-rotatable with the first crank and which second crank is connected to the steering-rod rearward end; the first crank is contingently abuttable against appropriate blocking stops to prevent sulky jackknifing; the steering-rod intersects the sulky longitudinal-axis to cause the sulky to follow the turning towing vehicle in a non-centripital pathway; and the frontal hitching means provides a convenient, reliable, and multi-directional connection between the towing vehicle and the trailing sulky.

BRIEF DESCRIPTION OF THE DRAWING

In the drawing, wherein like characters refer to like parts in the several views, and in which:

FIG. 2 is a rearward elevational view taken along lines 2—2 of FIGS. 1 and 3;

FIG. 2A is a sectional elevational view taken along lines 2A—2A of FIGS. 1 and 3; and FIG. 3 is a leftward side elevational view taken in the direction of lines 3—3 in FIGS. 1 and 2A.

DETAILED DESCRIPTION OF THE DRAWING

Figure 1:
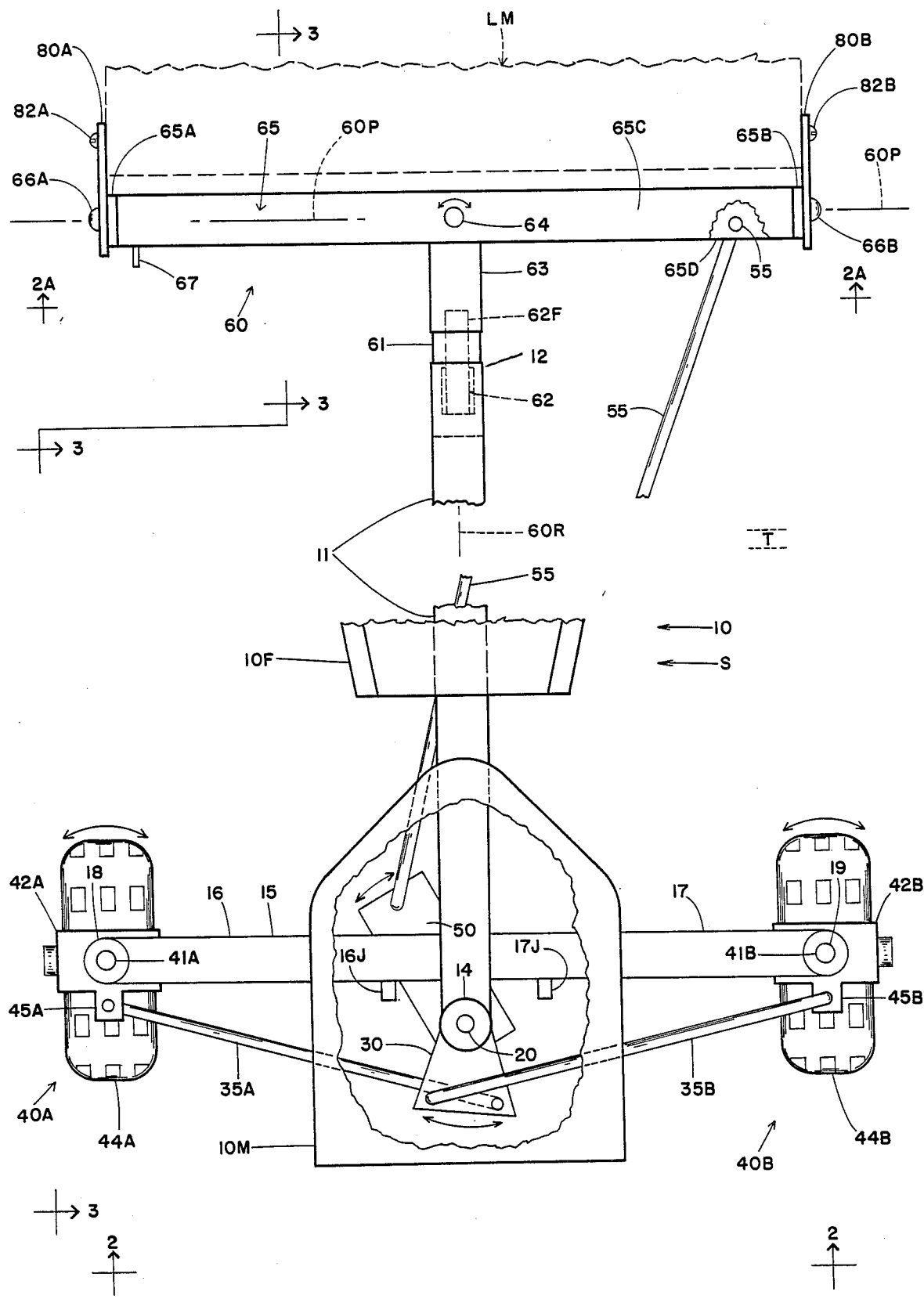
FIG. 1 is a top plan view of a representative embodiment "S" of the "steering sulky for self-propelled vehicles" of the present invention, isolated portions being broken away to show constructional details.

In drawing FIGS. 1, 2A, and 3, phantom lines (e.g. "LM") indicate some arbitrarily selected towing vehicle for the rearwardly attached steering sulky (e.g. S) of the present invention. For example, "LM" might refer to a self-propelled lawnmower towing vehicle wherein manually controlled clutches are operated for steering the towing vehicle i.e. the operator walking behind the lawnmower, or seated (10N) upon the sulky (S).

Steering sulky representative embodiment S has a chassis or frame member (e.g. 10) having a front-end 12 which may be attached (e.g. with hitch 60) to a suitable towing vehicle (e.g. lawnmower LM). As best seen in FIG. 1, frame member 10 might have a substantially T-shaped configuration in top plan view wherein the forward and longitudinally central portion comprises a towbar 11 having a rear-end 13 and said front-end and wherein the frame rearward portion comprises a directionally transversely extending and horizontal crossbeam 15 rigidly connected to towbar 11. On opposite transverse sides of towbar 11, crossbeam 15 has a left-flank 16 herein outwardly terminating as an upright tubular left-collar 18 defining a vertical left-bore and also has a right-flank 17 herein outwardly terminating as an upright tubular right-collar 19 defining a vertical right-bore. The frame member is rearwardly provided with an upright rear-collar (e.g. 14) defining a vertical central-bore. For example, rear-collar 14 might be welded to towbar rear-end 13.

Extending downwardly from the respective crossbeam flanks is a pair of wheelmounts including a left-wheelmount 40A having a vertical left-stud 41A revolvably journalled by left-collar 18 and also including a right-wheelmount 40B having a vertical right-stud 41B revolvably journalled by right-collar 19. Herein, each of said wheelmounts 40 comprises a fork (42A, 42B) of inverted-U cross-sectional shape, said forks 42 being provided with horizontal axles (43A, 43B) for the sulky wheels or tires (44A, 44B). There are lever means for causing the respective wheelmounts to rotate about said vertical studs (41A, 41B). For example, such lever means might take the form of rearwardly extending ears for the upper portions of forks 42 such as left-ear 45A of left-fork 42A and right-ear 45B of right-fork 42B.

Revolvably journalled by and extending downwardly of frame rear-collar 14 is vertical central-stud 20 having its lower elevations provided with two crank stations (e.g. 30, 50) respectively extending rigidly radially from and being co-rotational with central-stud 20. A first crank station (e.g. 30), and which is herein depicted at an elevation higher than for crank second station (e.g. 50), extends partially radially leftwardly and also partially radially rightwardly of central-stud 20. In the latter regard, it is permissible to employ two separate radiating members for the first crank; but herein, the first crank is depicted as a single and generally triangular member 30. There is a pair of links for simultaneously effecting similar directional steering of the substrate-engaging wheel means (e.g. 44) and including a left-link 35A having its two end portions pivotably connected to said left-ear (45A) and to said first crank (50). Analagously, there is a right-link 35B having its two end portions pivotably connected to said right-ear (45B) and to said first crank. Preferably, and as shown by the overlapping condition of links 35A and 35B in FIGS. 1 and 2, the left-link is pivotably connected to the rightwardly radiating portion of the first crank means 50 and the right-link is pivotably connected to the leftwardly radiating portion of first crank means 50. such preferred overlapping condition of links 35A and 35B provides a geometrical relationship between the two wheels 44 which allows for true rolling of the wheels without slippage on the underlying substrate T. Avoidance of such slippage is especially important to prevent damage to turf substrates, as when the towing vehicle is a lawnmower LM.

Elongate steering-rod 55 has it rearward end portion pivotably connected to said second crank 50. Steering-rod 55 has its forward end portion pivotably connected at the forward hitching means at a position (e.g. 65D) that is transversely offset from the towbar frontal region (12, 64). As best seen in the FIG. 1 top plan view, and for reasons to be explained later in greater detail, steering-rod 55 preferably intersects an imaginary vertical plane extending longitudinally along frame member towbar 11.

There are sulky anti-jackknife means to limit the extent of revolvability of left-wheelmount 40A about the frame member leftbore (e.g. at 41A) and of the right-wheelmount 40B about the frame member rightbore (e.g. at 41B). Herein, such anti-jackknife means comprises a pair of abutment blocks (16J, 17J) respectively positioned for eventual contingent impingement by the first crank means, namely:

(a) left-block 16J extending rigidly downwardly from crossbeam left-flank 16, and (b) right-block 17J extending rigidly downwardly from the crossbeam right-flank 17.

The chassis or frame member (10) is provided with means for supporting riding personnel thereon. Such personnel support means might comprise rearwardly disposed seating means such as pedestal 10M attached to frame components 11 and/or 15; a cushioned seat 10N is attachable to pedestal 10M. The personnel support means might additionally comprise a forwardly disposed footrest means 10F attached to frame component 11. Thus, a sulky rider supported at 10N and at 10F might extend his arms forwardly to operate the steering or other controls of a towing vehicle (e.g. LM).

Attached to the frame means and preferably extending both longitudinally forwardly and bi-directionally transversely of the front-end (e.g. 12) are hitching means for effecting a longitudinally trailing attachment of the sulky to the towing vehicle (e.g. LM). A rudimentary hitching means might simply consist of a vertical pin 64 pivotably connecting towbar 11 to the towing vehicle (e.g. LM). However, the hitching means preferably furnishes multi-directional flexure between the towing and sulky vehicles. As will be described in the ensuing paragraphs, such multi-directional flexure is desireably tri-directional and includes "roll" (e.g. 62), "yaw" (e.g. 64), and "pitch" (e.g. 66) capabilities for the trailing sulky (e.g. S).

Hitching means "roll" capability about a longitudinally extending and generally horizontal roll-axis 60R is effected by a longitudinally extending roll-collar 61 rigidly attached to the towbar and extending forwardly of towbar front-end 12. Roll-collar 61 revolvably surrounds the rearward portion of a longitudinally extending roll-stud 62. The forward portion 62F of roll-stud 62 is nonrevolvably (e.g. threadedly) attached to the rearward portion of a hitch component (e.g. yaw-collar member 63).

Hitching means "yaw" capability about a vertical yaw-axis 60Y is effected by a vertically extending yaw-stud 64 that is revolvably journalled by jaw-collar member 63. Extending bi-directionally transversely of yaw-stud 64 and pivotably attached thereto is an elongate channel member 65 having horizontal flanges 65C and 65D joined by the vertical web of channel member 65.

Hitching means "pitch" capability about a transversely extending horizontal pitch-axis 60P is effected by a pair of transversely extending terminal pins (66A, 66B) at the respective terminii of channel member 65 and which terminal pins are revolvably supported by transverselyspaced rearward extensions (e.g. 80A, 80B) of the towing vehicle. One of the terminal pins (e.g. right-pin 66B) might be rigidly attached to an endward closure (e.g. 65B) of the channel member. However, at least one of said terminal pins is desirably resiliently deflectable toward the yaw-stud (64) to permit ready positioning of the hitching means between such towing vehicle rearward extensions. In the latter regard, 82A and 82B depict screw fasteners for attaching representative rearward extensions 80A and 80B having transversely aligned openings. The aforementioned resiliency for left-pin 66A might entail usage of channel interior pin-guide 69 depending from upper flange 65C and having an opening in horizontal alignment with the opening of channel endward closure 65A. Left-pin 66A is provided with enlarged shoulder 67 and with enlarged tab 68. A helical spring 70 surrounds left-pin 66A between shoulder 67 and pinguide 69. Accordingly, a herein appropriate rightward movement of tab 68 causes the entire left-pin 66A to move rightwardly and to compress spring 70 which then (upon manual release of tab 68) permits left-pin 66A to extend through horizontally aligned openings of endward closure 65A and of said leftward extension 80A.

Having now structurally described representative sulky embodiment S, its operation will now be summarized, reference being made to the strategically placed double-headed curved arrows in drawing FIG. 1.

If the sulky rider decides to steer the towing vehicle (e.g. LM) leftwardly (i.e. FIG. 1 counterclockwise), the transversely constrained channel member 65 of sulky hitch 60 slavishly follows the leftwardly turning towing vehicle. Inasmuch as the forward end of fixed-length steering-rod 55 is pivotably attached to a transversely offset location (e.g. 65D at 65B) of hitch component 65, the towing vehicle leftward turn pulls forwardly on steering-rod 55. This steering-rod forward pull initiates angularly similar clockwise movements for second crank 50, for central-stud 20, for first crank 30, and for wheelmounts 42A and 42B. Such last mentioned clockwise movements cause sulky S to self steer in a non-centripital trailing relationship to the leftwardly turning towing vehicle. As previously mentioned, angularly turnable first crank 30 is ultimately abuttably arrestable against left-block 16J to prevent sulky jackknifing.

In the alternate situation wherein the sulky rider decides to steer the towing vehicle rightwardly (i.e. FIG. 1 clockwise), the slavishly following hitch component 65D pushes rearwardly on steering-rod 55. This steering-rod rearward push initiates angularly similar counterclockwise movements for second crank 50, for centralstud 20, for first crank 30, and for wheelmounts 42A and 42B. Such last mentioned counterclockwise movements cause sulky S to self steer in a non-centripital trailing relationship to the rightwardly turning towing vehicle. As previously mentioned, angularly turnable first crank 30 is ultimately abuttably arrestable against right-block 17J to prevent sulky jackknifing.

From the foregoing, the construction and operation of the steering sulky for towing vehicles concept will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. For use in longitudinally extending attached relationship with a lawnmower towing vehicle, a self steering sulky comprising:
   (A) a frame member including a directionally longitudinally extending towbar providing the frame forward portion and said towbar having a front-end and a rear-end, said frame member at the rearward portion comprising a directionally transversely extending and substantially horizontal crossbeam connected to said towbar said crossbeam being provided with transversely separated vertical bores including a left-bore and a right-bore, said frame member being rearwardly provided with a rear-collar defining a vertical central-bore, and said frame member being provided with means for supporting riding personnel thereupon and who may thereat operate the lawnmower towing vehicle;
   (B) a pair of wheelmounts extending downwardly from the crossbeam and including a left-wheelmount having a vertical left-stud revolvably journalled by the crossbeam left-bore and also including a right-wheelmount having a vertical right-stud revolvably journalled by the crossbeam right-bore, the lower portion of each wheelmount at a horizontal wheel-axis revolvably supporting a turfengaging wheel means, said left-wheelmount spaced from said left-stud being provided with a horizontally extending left-ear, and said right-wheelmount spaced from said right-stud being provided with a horizontally extending right-ear;
   (C) revolvably journalled by said rear-collar central-bore, a vertical central-stud extending downwardly from the frame rear-collar, said central-stud being provided with at least two rigidly radially extending crank means including a first crank means that extends partially leftwardly and also partially rightwardly of said central-stud;
   (D) a pair of links for simultaneously effecting similar directional steering of said wheel means including a left-link having its two end portions pivotably connected to said left-ear and to the rightward portion of said first crank means, and there also being a right-link having its two end portions pivotably connected to said right-ear and to the leftward portion of said first crank means;
   (E) attached to the elongate tow bar of the frame member and extending longitudinally forwardly and bi-directionally transversely of the towbar front-end, hitching means for attaching the towing vehicle and the steering sulky, said hitching means providing between the towing vehicle and sulky relative movements along: a vertically extending yaw-axis, a transversely extending pitch-axis, and a longitudinally extending roll-axis;
   (F) an elongate steering-rod having its two end portions respectively pivotably connected to the second of said crank means and also to said hitching means at a position transversely offset from said vertically extending yaw-axis, and said steering-rod intersecting an imaginary vertical plane extending longitudinally along said frame towbar; and
   (G) anti-jackknife means to limit the extent of revolvability of the left-wheelmount about the frame member left-bore and of the right-wheelmount about the frame member right-bore provided on said cross member.

2. The steering sulky of claim 1 wherein the terminus of the crossbeam left-flank is provided with a left-collar that defines said left-bore and the terminus of the crossbeam right-flank is provided with a right-collar that defines said right-bore.

3. The steering sulky of claim 2 wherein the towbar rear-end is provided with said rear-collar; wherein the personnel supporting means includes rearwardly disposed seating means and forwardly disposed footrest means; and wherein the steering-rod intersects an imaginary vertical plane extending longitudinally along the frame member towbar.

4. The steering sulky of claim 1 wherein said anti-jackknife means comprises a pair of abutment blocks for eventual impingement by the first crank means, including a left-block extending rigidly downwardly from the crossbeam left-flank and a right-block extending rigidly downwardly from the crossbeam right-flank.

5. The steering sulky of claim 1 wherein said radially extending first crank means extends partially leftwardly and partially rightwardly of said central-stud.

6. The steering sulky of claim 5 wherein the left-link is pivotably connected to said rightward radial portion of said first crank means and wherein the right-link is pivotably connected to said leftward radial portion of said first crank means.

7. The steering sulky of claim 6 wherein the leftward radiating portion and the rightward radiating portion of said first crank means is wholly provided by a single and generally triangular member.

8. The steering sulky of claim 7 wherein the left-ear is integrally connected to and provides a rearward extension of the leftwheelmount, and wherein the right-ear is integrally connected to and provides a rearward extension of the right-wheelmount; and wherein the first crank means wholly consists of a single, generally triangular member.

9. The steering sulky of claim 1 wherein the hitching means provides between the towing vehicle and sulky relative movements along: a vertically extending yaw-axis, a transversely extending pitch-axis, and a longitudinally extending roll-axis.

10. The steering sulky of claim 9 wherein said roll capability is effected by a longitudinally extending roll-collar rigidly attached to the towbar frontal portion and revolvably surrounding the rearward portion of a longitudinally extending roll-stud, the forward portion of said roll-stud being non-revolvably attached to the rearward portion of an upright yaw-collar having a forwardly positioned vertical yaw-bore; wherein said yaw capability is effected by a bidirectionally transversely extending channel member having a central portion attached to a vertically extending yaw-stud that is revolvably journalled by said yaw-collar; and wherein said pitch capability is effected by a pair of transversely extending terminal pins at the two terminii of said channel member and including a left-pin and a right-pin.

11. The steering sulky of claim 10 wherein at least one of said horizontally transversely extending terminal pins is resiliently transversely deflectable along said channel member and toward said yaw-stud to permit ready positioning of said hitching means between rigidly transversely-spaced rearward extensions for the towing vehicle; and wherein the steering-rod forward portion is pivotably attached to said channel member lower portion at a position transversely away from said yaw-stud.

12. The steering sulky of claim 1 wherein the leftward radiating portion and the rightward radiating portion of said first crank means are wholly provided by a single and generally triangular member; and wherein said anti-jackknife means comprises a pair of abutment blocks for eventual impingement by said triangular first crank, including a left-block and a right-block extending rigidly downwardly from transversely separated portions of said crossbeam.

* * * * *